US009366574B2

(12) United States Patent
Pereverzev (10) Patent No.: US 9,366,574 B2
(45) Date of Patent: Jun. 14, 2016

(54) INFRARED (IR) PHOTON-SENSITIVE SPECTROMICROSCOPY IN A CRYOGENIC ENVIRONMENT (71) Applicant: Lawrence Livermore National Security, LLC, Livermore, CA (US)

(72) Inventor: Sergey Pereverzev, San Ramon, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 14/642,631

(22) Filed: Mar. 9, 2015

(65) Prior Publication Data
US 2015/0253195 A1    Sep. 10, 2015

Related U.S. Application Data (60) Provisional application No. 61/949,880, filed on Mar. 7, 2014.

(51) Int. Cl.
*G01J 5/02* (2006.01)
*G01J 5/06* (2006.01)
*G01J 3/02* (2006.01)
*G01J 3/18* (2006.01)

(52) U.S. Cl.
CPC .............. *G01J 5/061* (2013.01); *G01J 3/021* (2013.01); *G01J 3/18* (2013.01)

(58) Field of Classification Search
CPC ....................................................... G01J 5/061
See application file for complete search history.

(56) References Cited

U.S. PATENT DOCUMENTS

2008/0074646 A1* 3/2008 Archibald ................. 356/51
2010/0327163 A1* 12/2010 Sadleir ..................... 250/336.2
2012/0201268 A1* 8/2012 Boyd et al. ............... 374/33

OTHER PUBLICATIONS

Karasik, et al., "Energy-resolved detection of single infrared photons with ? = 8 ?m using a superconducting microbolometer," Applied Physics Letters 101, 052601, 2012, pp. 1-17.
(Continued)

*Primary Examiner* — David Porta
*Assistant Examiner* — Hugh H Maupin
(74) *Attorney, Agent, or Firm* — Zilka Kotab, PC (57) ABSTRACT

A system designed to suppress thermal radiation background and to allow IR single-photon sensitive spectromicroscopy of small samples by using both absorption, reflection, and emission/luminescence measurements. The system in one embodiment includes: a light source; a plurality of cold mirrors configured to direct light along a beam path; a cold or warm sample holder in the beam path; windows of sample holder (or whole sample holder) are transparent in a spectral region of interest, so they do not emit thermal radiation in the same spectral region of interest; a cold monochromator or other cold spectral device configured to direct a selected fraction of light onto a cold detector; a system of cold apertures and shields positioned along the beam path to prevent unwanted thermal radiation from arriving at the cold monochromator and/or the detector; a plurality of optical, IR and microwave filters positioned along the beam path and configured to adjust a spectral composition of light incident upon the sample under investigation and/or on the detector; a refrigerator configured to maintain the detector at a temperature below 1.0K; and an enclosure configured to: thermally insulate the light source, the plurality of mirrors, the sample holder, the cold monochromator and the refrigerator.

20 Claims, 2 Drawing Sheets

(56) References Cited

OTHER PUBLICATIONS

Wei, et al., "Ultrasensitive hot-electron nanobolometers for terahertz astrophysics," nature nanotechnology, vol. 3, Aug. 2008, pp. 496-500.

Booth, N.E., "Quasiparticle trapping and the quasiparticle multiplier," Applied Physics Letters, vol. 50, No. 5, 1987, pp. 293-295.

Karasik et al., "Development of the nano-HEB array for low-background far-IR applications," Proc. SPIE, vol. 7741, 2010, pp. 1-10.

Kinion et al., "Microstrip superconducting quantum interference device radio-frequency amplifier: Scattering parameters and input coupling," Applied Physics Letters, vol. 92, No. 17, 2008, pp. 1-9.

Santavicca et al., "Energy resolution of terahertz single-photon-sensitive bolometric detectors," Applied Physics Letters, vol. 96, No. 8, 2010, pp. 1-11.

Pereverzev et al., "Spectroscopic study of excess electrons in liquid helium," Physica B, 1994, pp. 347-359.

\* cited by examiner

INFRARED (IR) PHOTON-SENSITIVE SPECTROMICROSCOPY IN A CRYOGENIC ENVIRONMENT

PRIORITY CLAIM

The present invention is related to, and claims the benefit of priority from U.S. Provisional Patent Application No. 61/949,880, filed Mar. 7, 2014, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to infrared (IR) spectroscopy, and more particularly to single-photon-sensitive IR spectromicroscopy.

BACKGROUND

Infrared spectroscopy is a powerful tool well-recognized as suitable for use in a variety of applications including cell biology, drug discovery, chemical composition analysis and material analysis. However, IR spectromicroscopy detection is limited by the signal-to-noise ratio achievable in a given IR spectromicroscopy system, while the main noise contribution in Mid-IR spectromicroscopy is thermal radiation background. To address this limitation, previous efforts have employed a very bright light source such as synchrotron radiation to achieve resolution sufficient for interrogating absorption or reflection spectra of very small samples such as a single biological cell, within a population of cells, small biomolecules, etc.

As known in the art, the infrared spectrum is conventionally divided into three sub-ranges, dubbed the near-, mid-, and far-IR regions, respectively. Near-IR is to be understood as corresponding to photons of light having a wavelength in a range from about 700 nm to about 3 um; mid-IR is to be understood as corresponding to photons of light having a wavelength in a range from about 3 um to about 15 um; and far-IR is to be understood as corresponding to photons of light having a wavelength in a range from about 15 um to about 1 mm.

However, requiring synchrotron light sources as a component of a Mid-IR spectromicroscopy system imposes undesirable consequences. Indeed, most synchrotron apparatuses are prohibitively large and/or expensive for most laboratory settings to obtain, maintain, and utilize. As a result, access to this technology is highly competitive and research progress rates are correspondingly slow. Furthermore, many conventional approaches that use synchrotron or other very bright light sources have the propensity to destroy biological samples, which is an undesirable limitation especially where sample availability is limited, such as commonly is the case with clinical tissue samples, national security applications, etc. Further still, synchrotron or other bright light-source IR spectromicroscopy systems typically operate at or above room temperature, which increases thermal radiation background which at room temperature makes single photon detection impossible simply by overloading photon sensitive detectors.

Moreover, all life-important chemical interaction are situated in the mid-to-far infrared energy range (e.g. at around a temperature of about 300K, or an energy of ~30 meV). Mid-IR and Far-IR spectroscopy are powerful tools for analysis of chemical compositions and chemical bonds, for biomedical, chemical or material science purposes. Raman scattering of visible light is the conventional tool for chemical microspectroscopy. Currently Raman scattering of visible light (where single photon detectors are available) is in use to get information about energy levels in the Mid-IR region, but, to get single molecular sensitivity (ability to detect presence of single molecule of interest inside the sample) these applications required destructive visible light intensities unsuitable for use in measuring Raman spectra of live or otherwise delicate samples. Finally, cross sections of direct infrared photon interactions like absorption, resonant scattering, etc. are 6 to 12 orders of magnitude larger than the cross section of Raman scattering of visible light photons.

Accordingly, it would be beneficial to provide new systems, methods, and/or computer program products enabling infrared spectromicroscopy such that, particularly in the mid-IR and far-spectral regions, single-photon sensitive Mid-IR spectromicroscopy techniques can be employed to minimize radiational load on the system and permit mid-IR and far-IR emission study of small and/or delicate samples such as living cells, small biomolecules, etc. Potentially, a single molecular detection can be achieved.

SUMMARY

In one embodiment, a photon-sensitive infrared (IR) spectromicroscopy system includes: a light source; a plurality of mirrors configured to direct light emitted from the light source along a beam path; a sample holder positioned in the beam path; a cold monochromator configured to direct a single wavelength of light onto a detector; a sub-K refrigerator configured to maintain a detector temperature below an upper operational temperature threshold less than about 1.0K; and an enclosure configured to: thermally insulate the light source, the plurality of mirrors, the sample holder, the cold monochromator and the refrigerator.

In another embodiment, a method includes performing photon-sensitive IR spectromicroscopy using a system including a light source; a plurality of mirrors configured to direct light emitted from the light source along a beam path; a sample holder positioned in the beam path; a cold monochromator configured to direct a single wavelength of light onto a detector; a sub-K refrigerator configured to maintain a detector temperature below an upper operational temperature threshold less than about 1.0K; and an enclosure configured to: thermally insulate the light source, the plurality of mirrors, the sample holder, the cold monochromator and the refrigerator.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Embodiments described herein provide systems and methods for single-photon infrared spectromicroscopy.

In one general embodiment, a photon-sensitive infrared (IR) spectromicroscopy system includes: a light source; a plurality of mirrors configured to direct light emitted from the light source along a beam path; a sample holder positioned in the beam path; a cold monochromator configured to direct a single wavelength of light onto a detector; a sub-K refrigerator configured to maintain a detector temperature below an upper operational temperature threshold less than about 1.0K; and an enclosure configured to: thermally insulate the light source, the plurality of mirrors, the sample holder, the cold monochromator and the refrigerator.

In another general embodiment, a method includes performing photon-sensitive IR spectromicroscopy using a system including a light source; a plurality of mirrors configured to direct light emitted from the light source along a beam path; a sample holder positioned in the beam path; a cold monochromator configured to direct a single wavelength of light onto a detector; a sub-K refrigerator configured to maintain a detector temperature below an upper operational temperature threshold less than about 1.0K; and an enclosure configured to: thermally insulate the light source, the plurality of mirrors, the sample holder, the cold monochromator and the refrigerator.

In still another general embodiment, a photon-sensitive infrared (IR) spectromicroscopy system includes: a light source; a plurality of cold mirrors configured to direct light emitted from the light source along a beam path; a cold or warm sample holder positioned in the beam path; a sample holder, such as a container, at least a portion of which is transparent in at least the spectral range of interest, so that the portions, and/or the entire sample holder do not emit thermal radiation in the same spectral region of interest where they are transparent, and configured to suppress thermal radiation background in a spectral region of interest. The system also includes a cold monochromator or another spectral device such as a cold monochromator, an interferometer, filter, polarization device, etc., configured to direct a single wavelength, or/and polarization, or a number of selected wavelength and/or polarizations of light onto a cold detector; a system of cold apertures and shields positioned along the beam path and configured to prevent unwanted thermal radiation, e.g., from the sample holder, from arriving at the cold monochromator and/or the detector; a cold filter system positioned along the beam path and configured to adjust a spectral composition of light incident upon either the sample under investigation and/or the detector; a refrigerator configured to maintain the detector at a working detector temperature, preferably below 1.0K; and an enclosure configured to: thermally insulate the light source, the plurality of mirrors, the sample holder, the cold monochromator and the refrigerator.

Due to progress in the development of IR semiconductor lasers and IR detectors, it is possible to use single photon techniques in Mid IR (3-15 micron) and in Far-IR (15 micron-1 millimeter) bands of the electromagnetic spectrum. Without wishing to be bound to any theory, the inventor notes the cross-section for absorption/resonance scattering of IR photons in the same range is about 6-12 orders of magnitude larger than for Raman scattering of visible photons when one is probing the same energy levels in molecules, which permits single-molecule detection sensitivity previously unattainable using systems and methods taught in the prior art.

To take advantage of single-photon techniques in the mid-IR, it is advantageous to minimize, and preferably eliminate, IR backgrounds arising from thermal radiation, which at room temperature has maximum spectral intensity at about 10 micron wavelength. This background can be eliminated completely, in one embodiment, by cryogenic cooling of samples, and making measurements in cryogenic environment using cooled spectroscopic equipment. Cryogenic cooling has wide use for storage of cell cultures, sperm or eggs. Low intensity Mid-IR irradiation is harmless for large class of important biological samples. High sensitivity spectromicroscopy of cooled samples in cryogenic environment would therefore allow non-destructive chemical imaging, with single-molecule sensitivity.

Figure 1:
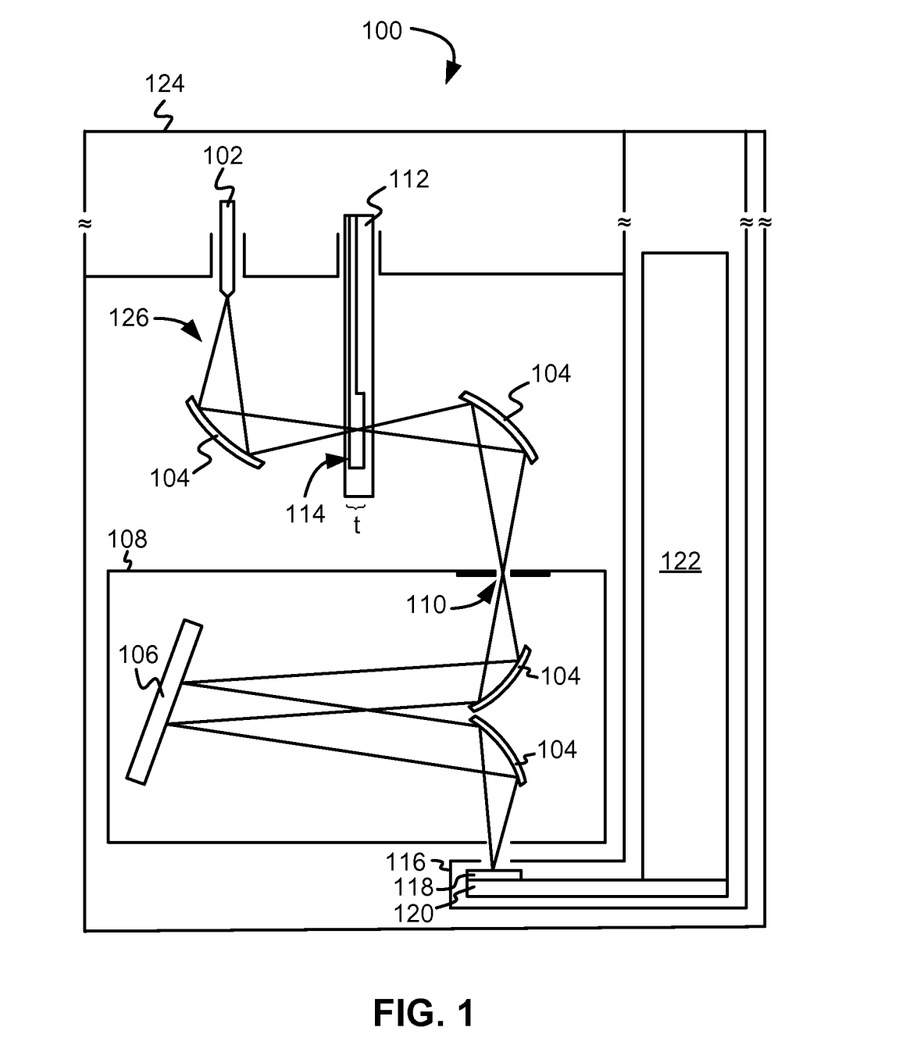
FIG. 1 illustrates two plots of relative intensity versus wavelength for several scintillator samples.

Additionally and/or alternatively, thermal backgrounds can be partially eliminated by placing living cells into non-equilibrium thermodynamic conditions (e.g. high (~300K—room temperature) lattice temperature and low thermal radiation energy density). A non-equilibrium environment, deficient in thermal radiation, can be produced by placing samples into small warm sample holder 112 transparent in the Mid-IR and/or Far-IR regions, ensuring the sample holder 112 neither absorbs nor emits light in the Mid-IR or Far-IR range being used to interrogate the sample, in combination with low optical density of the sample in the spectral range of interest. Sufficiently low thermal radiation background for photon-sensitive measurements may be maintained using a cryogenic environment and cold optics around the sample holder 112, such as shown in FIG. 1, below, in multiple approaches. For a live cell in a water environment this may be achieved by using a thin water layer (with a thickness comparable to the smallest dimension of the living cell) to position the cell in a transparent window 114 of the sample holder 112.

This set-up permits the study of mid-IR emission of living cells previously unachievable. Observing emissions in this energy range is important to enable characterization of ongoing metabolic or other cell biochemical processes without destroying the sample. The presently disclosed embodiments also enable resonant light scattering, photoluminescence or other single-photon techniques in the Mid-IR to Far-IR energy range to non-destructively interrogate delicate samples such as living cells.

For measurements of single IR photons, a cold cryogenic environment, a source of IR radiation, a cold spectral device, a special sample holder or micro-fluidic cell, and a photon detector for mid-IR radiation are all preferred. The cold cryogenic environment can be produced by placing various experimental components into vacuum space surrounded by cold walls of the cryostat. Cooling can be achieved with liquid helium, liquid nitrogen, with a mechanical cryo-cooler, etc. depending on the particular temperature range desired. One exemplary embodiment of a photon-sensitive IR spectromicroscopy system is shown in FIG. 1 and described in further detail below.

An exemplary photon-sensitive IR spectromicroscopy system 100 is shown in FIG. 1, according to one embodiment. The configuration shown in FIG. 1 is provided by way of example and is not to be considered limiting on the scope of the present disclosure. Rather, any equivalent arrangement as would be understood by one having ordinary skill in the art upon reading the present descriptions may be employed to achieve photon-sensitive IR spectromicroscopy as disclosed herein without parting from the scope of the instant application.

In one embodiment, a system, includes: a light source; a plurality of mirrors configured to direct light emitted from the light source along a beam path; a sample holder positioned in the beam path; a cold monochromator configured to direct a single wavelength of light onto a detector; a refrigerator; and an enclosure configured to insulate the light source, the plurality of mirrors, the sample holder, the cold monochromator and the refrigerator from external thermal radiation and other heat influxes, wherein the system is capable of photon-sensitive infrared (IR) spectromicroscopy.

As shown in the exemplary embodiment of FIG. 1, the system 100 includes a light source 102 for projecting light 126 onto a detector 118. In particular, the light 126 is reflected by a plurality of mirrors 104 along a beam path leading to the detector 118. The light 126 emitted from light source 102 is reflected by a first mirror 104 and directed toward a sample positioned in a window 114 of a sample holder 112 positioned in the beam path. Light 126 passing through and/or emitted by the sample is reflected by a second mirror 104 and directed through an input slit 110 into a cold monochromator 108. In the monochromator 108, light is reflected by a third mirror 104 onto a monochromator grating 106, which directs a single wavelength of light toward a fourth mirror 104 and onto the detector 118.

Components of the system 100, for example the light source 102, sample holder 112, cold monochromator 108, mirrors 104, detector 118 and cold finger 120 are positioned in a cryogenic environment and cooled to low temperatures, such as about 4 Kelvin in one embodiment. The arrangement depicted in FIG. 1 includes using a sub-K refrigerator 122 to provide even lower temperature required for operation of the single photon detector. Moreover, a sub-K refrigerator shield 116 and 4 K thermal enclosure 124 provide thermal insulation to minimize thermal background radiation and detector noise within the system 100. An additional shield may be present between the sub-K refrigerator and the 4 K thermal enclosure, as would be apparent to one skilled in the art.

Preferably, the cryogenic environment is sufficiently cold to achieve a sub-K detector temperature in a range below about 1 K, more preferably from about 0.1K to about 1K and still even more preferably from about 0.1K to about 0.3K, in various embodiments. For the detector, the temperature should be less than 1K. In one experiment, the detector functioned well in a temperature range of 0.1K to 0.3K.

Semiconductor lasers may be used as the light source 102, e.g. IR radiation source. They can operate at cryogenic temperatures and are available for large range of wavelengths, from UV or visible light to mid-IR and sub-mm wavelength. A thermal light source and an additional cooled monochromator can also be used as an adjustable wavelength source. The cooled monochromator is a preferable advantage for analyzing mid-IR emission spectra from the sample.

Semiconductor LASERs (for example Quantum Cascade LASERs or narrow-band semiconductor LASERs) are currently available for almost any wavelength in Mid-IR and Far-IR. Photon detectors for this energy range are emerging (specifically, hot electron superconducting bolometers and micro-calorimeters can be used).

In addition, any type of external laser can be used, provided propagation of thermal radiation from along the light path is prevented from entering the system, such as by using cold optical filters and/or cold optical attenuators.

A sample holder transparent to mid-IR radiation is preferred. Quartz can be used as a material. Other exemplary materials suitable for use as the sample holder include germanium, silicon, sapphire, etc. as would be understood by one having ordinary skill in the art upon reading the present descriptions. IR absorption and IR emissivity of material are closely connected; if material does not absorb light at certain wavelength, it does not emit light at this wavelength either. To place living cell into nonequilibrium conditions of high lattice temperature and low thermal radiation level one may utilize a container with walls transparent to mid-IR radiation and thin layer of water for the cell. Nonequilibrium conditions may be achieved and maintained by leveraging the thermal conductivity properties of the sample, the sample holder, and the cryogenic environment. Because water absorbs (and emits) IR radiation, the water layer is preferably as thin as possible, such as the thickness of a living cell. An exemplary range is about 30-100 microns, but could be higher or lower. A micro-fluidic container may be formed from one or more of, e.g., quartz, sapphire, germanium, etc., and can be designed to feed the cell with different chemical solutions in the course of measurements.

A sample holder can alternatively be configured so as to contain very thin windows (foils) for IR radiation. Materials of the windows in this case can absorb and emit IR radiation in the spectral region of interest, but because of small thickness this absorption and emission is negligible with respect to measurements performed using the detector. In this case additional cold apertures and shields can be added to the radiation path to prevent thermal radiation from warmer (e.g. bulk) parts of the sample holder from entering monochromator (or other spectral analysis devices/components in use) and thus prevent such radiation from reaching the detector correspondingly. As examples of materials suitable for making thin windows/foils, one can use MYLAR, or CAPTON, or other sufficiently strong and transparent materials in the spectral region of interest.

The sub-K refrigerator 122 may be any type of cooling unit capable of establishing and maintaining a cryogenic environment within the enclosure 124. In several embodiments, exemplary refrigerators include $^3$He refrigerator, dilution refrigerators, adiabatic demagnetization refrigerators, etc. as would be understood by one having ordinary skill in the art upon reading the present descriptions.

The cold monochromator 108 may include one or more mirrors 104 and a monochromator grating 106 configured to direct only a single wavelength of light toward the detector 118. The monochromator may be configured based on the wavelength at which sample IR emission spectra are to be measured to only direct light of the corresponding wavelength toward the detector 118.

In one approach, an exemplary photon-sensitive IR spectromicroscopy system includes a light source; a plurality of mirrors configured to direct light emitted from the light source along a beam path; a sample holder positioned in the beam path; a cold monochromator configured to direct a single wavelength of light onto a detector; a sub-K refrigerator configured to maintain a detector temperature below an upper operational temperature threshold less than about 1.0K; and an enclosure configured to: thermally insulate the light source, the plurality of mirrors, the sample holder, the cold monochromator and the refrigerator, and preferably optically insulate one or more of the light source, the plurality of mirrors, the sample holder, the cold monochromator and the refrigerator. For example, the enclosure may optically insulate one or more component by blocking a light wavelength of interest, blocking all extraneous light from entering the enclosure, etc.

Figure 2:
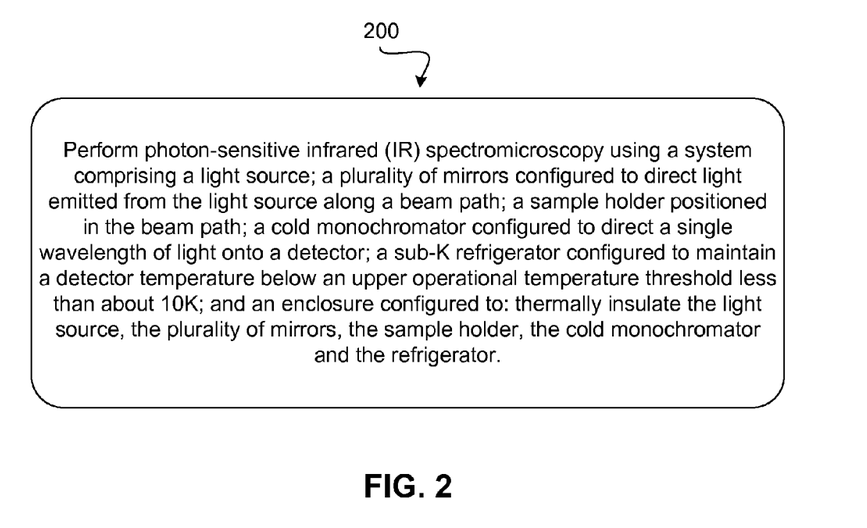
FIG. 2 is a flowchart of a method, according to one embodiment.

Similarly, in another embodiment a method of performing photon-sensitive IR spectromicroscopy using systems such as described herein is shown in FIG. 2. The method 200 may be performed in any suitable environment such as would be appreciated by a skilled artisan reading these descriptions, including those depicted in FIG. 1, among others.

In one approach the method 200 includes performing photon-sensitive IR spectromicroscopy using the system 100.

In other approaches, performing the photon-sensitive IR spectromicroscopy comprises placing a sample in the sample holder, cooling the detector to an operational temperature below the upper operational temperature threshold (preferably less than about 1K), illuminating the sample using the light source (preferably a quantum cascade laser), and observing the illuminated sample via the detector. The light source may be configured to emit pulses at a desired wavelength and frequency in order to fine-tune the detector to be capable of performing single-photon detection in the desired spectral range.

Advantageously, the system is characterized by a lower detection limit of approximately a single photon, and is capable of performing single-photon detection in a spectral range comprising the near-IR range. Accordingly, in some approaches the single photon is characterized by a wavelength less than about 10 um.

In order to accomplish single-photon detection, it is advantageous to ensure the enclosure is configured to maintain the detector temperature in a range from about 0.1 K to about 1 K.

In some approaches, the sample holder comprises two windows having a gap therebetween. The gap is characterized by a thickness t, where t is approximately equal to a smallest dimension of a sample cell that would allow the cell to enter or pass through the gap without being damaged. The window is preferably transparent to light having a wavelength in a range of detection (e.g. in the near-IR, mid-IR and/or far-IR spectral range(s)). In particularly preferred embodiments, the window is transparent to light having a wavelength in a range from between about 1.5 µm to about 0.1 mm.

In various embodiments, the detector includes at least one element selected from a group consisting of: a hot-electron superconducting micro-calorimeter, a quantum dot detector, a Kinetic Inductance Detector (KID), a Microwave Kinetic Inductance Detector (MKID), and a Cooper Pair Box-type detector.

Similarly, the light source preferably is a pulsed monochromatic quantum cascade laser (QCL).

The system may, in at least some embodiments, include an optional low-pass filter (LPF) in read-out scheme of photon detector, characterized by a cut-off threshold of approximately 10 kHz. Advantageously, the LPF is rejects white noise outside a bandwidth of detection.

In more embodiments, the system preferably includes a plurality of cold apertures and a plurality of shields positioned along the optical path. The cold apertures and shields are configured to prevent thermal emission originating from the sample holder from reaching the detector.

In some approaches, undesirable wavelengths of light may be filtered using at least one filter in the enclosure. Metal mesh filters of this variety are preferred for use in blocking thermal microwave radiation characterized by a wavelength greater than a desired wavelength of detection.

In more approaches, using transition-edge sensors as detectors, the detector superconducting transition temperature may be maintained below required operational threshold at least in part using a small superconducting solenoid next to the detector.

Even more preferably, a superconducting solenoid having an iron core is present. In operation, the superconducting solenoid may suppress the detector temperature at least in part by generating a magnetic field having an axis of orientation substantially perpendicular to a longitudinal axis of the detector.

Preferably, the detector comprises a titanium transition-edge sensor (TES) disposed as a film on a silicon substrate. Even more preferably, the titanium sensor is characterized by a volume of approximately 0.1 $\mu m^3$.

It is preferable for the use of some embodiments of the present invention to have a single photon detector operating in Mid-IR and it is desirable to have it operating in Far-IR spectral region. Various types of detectors that may be used in various embodiments are described below.

Single-photon detection in Mid-IR spectral region may be accomplished using a hot electron superconducting micro-calorimeter. This device is able to detect single photon and also to measure photon energy with low resolution. Such devices may also be able to detect sub-millimeter photons.

Hot electron superconducting micro-calorimeter includes a small bridge from a low superconducting transition temperature (low Tc) material (e.g. Ti, Ti nitrite, MoAu) in electrical contact with another superconducting material with higher Tc (Nb, NbTi, Pb, Sn, Al). Photons are absorbed in metal (micro-bridge) with production of energetic electrons. These energetic electrons can break Cooper pairs in the microbridge, producing non-paired electrons known as quasi-particles. The number of quasi-particles is in a sense the electron temperature in the micro-bridge: the more quasi-particles created, the higher the electron temperature. At low temperatures energy re-distribution inside electron system is much faster than energy exchange between electrons and lattice. In hot electron device, the electron system is cooled by electron-phonon interaction, which is weak at low temperatures. Because of this, the electron system is effectively thermally decoupled from the lattice.

At the superconducting transition temperature, the resistance of micro bridge rises sharply with increase of temperature. Increase of electron temperature has the same effect. Thus, absorption of photon in the micro bridge results in change of the micro-bridge resistance, which can be measured using a SQUID (Superconducting Quantum Interferometric Device). Quasi-particles cool down by electron-phonon interactions, and recombine back into Cooper pairs. Using contacts out of the higher Tc material prevents escape of the quasi-particles from the micro bridge by the process of Andreev reflection on the boundary with the higher Tc material.

Suitable micro-bridge dimensions are a few microns or smaller, which is smaller than radiation wavelength in mid-IR, but the micro-bridge can still be effectively coupled to radiation by micro-antenna made of highly conductive material (for example gold or high conductivity niobium film). For shorter wavelengths (below a few microns) effective micro-antennas has not yet been demonstrated, but photon absorbing fins out of higher Tc material can be made large for higher photon energies and can serve as photon absorber by itself. Thermodynamic considerations indicate that detection of sub-mm photons should be possible with superconducting hot electron devices. Currently, it was demonstrated that detection and simultaneous measurement of single mid-IR photon energy has been demonstrated with hot electron devices in experiments.

At temperatures well below the superconducting transition temperature of the micro-bridge, breaking Cooper pairs changes the effective inductance of the micro-bridge. This inductance is associated with the kinetic energy of the Cooper pairs in the superconductor and is called kinetic inductance. When a micro-bridge is part of resonant circuit or is itself a microwave resonator, the change in kinetic inductance is translated into a change of the resonance frequency of the resonant circuit, which frequency shift can be detected using external electronics. This type of detector is called Kinetic Inductance Detector or Microwave Kinetic Inductance Detector (KID, or MKID when resonance is in microwave range). This technology allows readout of large arrays of detectors with a relatively small number of cold amplifiers (frequency multiplexing technique). Detection of visible light photons has been demonstrated with MKID. With using of high-frequency SQUID-amplifier or other nearly quantum-limited amplifier, detection of Mid-IR photons with MKID is likely possible.

Detection of single Mid-IR and Far-IR photons is also achievable using quantum dot detectors. This is a semiconductor device where effective capacitance (responsivity) of multi-electron quantum dot is changing as a result of absorption of photon and transition of the quantum dot into an excited state. Single Electron Transistor (SET) may be used to read the resultant change in capacitance. However, it is difficult to read a large array of quantum dot detectors, coupling to radiation is not efficient and spectral sensitivity is non-uniform.

With Superconducting version of Single Electron Transition (a 'Cooper Pair Box') it is possible to detect the appearance of one quasi-particle inside small superconducting island (dot). Mid-IR and Far-IR photon detectors can be built using this principle. Single photon sensitivity of a sample at about room temperature is now achievable with this type of light detector, according to various embodiments of the present invention.

Of course, methods of performing photon-sensitive microscopy using the various systems and components described herein, as well as computer program products configured to cause a device to perform photon-sensitive spectromicroscopy, are also within the scope of the present disclosure. One having ordinary skill in the art will appreciate that any combination and/or permutation of the features described herein may be employed to accomplish photon-sensitive spectromicroscopy without departing from the scope of this application.

Practical Uses, Applications and Implementations

Several exemplary uses, applications and/or implementations of the systems and methods described herein are provided below. It is important to note these uses and related methods are provided by way of example only and are not limiting in any way on the claims.

The presently described inventive embodiments have a broad range of applications, including any application where chemical sensitivity on single molecular level is beneficial, including cell chemical imaging, non-destructive and safe cell analysis, nondestructive embryo evaluation for extra corporal fertilization techniques or cloning, drug development, and cellular level biofeedback for drug evaluation/development or for direct therapeutic applications, cryo-electron microscopy, material science, trace organic impurities detection, express biological sample analysis, security applications, etc.

Exemplary security applications include detection of biochemical agents in air in trace amounts; express breath analysis sensitive to drugs, hormones, neuromediators or other biological markers. Gas may be cooled or condensed on cold (cryogenic) surface to reduce thermal background. Single molecular detection threshold is possible with using single photon detection technique and resonant scattering or luminescence in IR.

Exemplary material sciences applications include: characterization for very small samples or small amount of impurities. IR spectra of large molecule are sensitive to molecular conformations. Detection of IR emission spectra in combination with cryoelectron microscopy will provide microscopic information on chemical composition (as opposed to mere elemental composition such as detectable using Auger spectroscopy).

Exemplary cell biology, biomedical and drug discovery-type applications include: non-distractive biochemical imaging of cells with single-molecular sensitivity; differentiation of cells in a culture by different biochemical response to drug/stimulus; possible real time observations of changers in a single cell metabolism or biochemical reactions, or gene regulation by looking at IR emission spectra.

It should be noted that a primary advantage of the presently disclosed inventive system configuration is to allow the aforementioned life-science related applications. In particular, it is possible using the presently disclosed inventive concepts to perform single-photon IR spectroscopy on a living sample contained in an environment having a temperature of approximately 300 K. Although such temperatures are prone to introducing thermal background, nonetheless single photon IR spectroscopy is possible by ensuring that the sample and sample holder are configured in such a manner as to render any thermal background negligible to the system's measurements.

As discussed generally above, in the background, the main difficulty in the field of mid and far-IR spectroscopy is the existence of thermal background radiation. The presently disclosed inventive concepts generally solve this problem in one of two ways. First, the system, including all components contained within an enclosure and including the sample contained in the sample holder is cooled to cryogenic temperature, which, depending on the spectral range of interest, can be a temperature in a range from that of either liquid nitrogen down or liquid helium.

Alternatively, all components within the system except the sample holder and sample may be cooled to a cryogenic temperature, and the sample may be maintained at nonequilibrium thermodynamic conditions at a temperature of approximately 300K, so long as thermal radiation in a particular spectral region of interest is suppressed. This suppression may be accomplished in part, for example, using known physical principles of absorbance and transmission to select appropriate materials to be completely transmissive in the spectral region of interest. In addition, since water absorbs and emits photons in the mid- and far-ranges of the IR spectrum, and the sample is provided in aqueous solution, it is essential that the path length of the sample holder is less than a radiation equilibration length for water in the spectral region of interest. As understood herein, radiation equilibration length is to be understood as a path length required for a particular wavelength of light to reach thermal equilibrium with a medium through which the wavelength travels.

Accordingly, sample holders as discussed herein are disclosed as having a thickness t, which should be understood to be configured, in various embodiments, to be a value less than a radiation equilibration length for the medium in which the sample is suspended in the spectral region of interest.

In addition, the presently disclosed techniques also extend beyond merely measuring absorption or reflection of samples, but also to investigate emission and/or fluorescence of samples caused by external radiation incident on the sample, or by metabolic processes occurring within the biological sample itself. This allows direct investigation of single-cell metabolic phenomena via mid- and far-range IR spectroscopy for a sample at room temperature, which has been heretofore impossible using conventional IR spectroscopy techniques.

While various embodiments have been described above, it should be understood that they have been presented by way of example only, and not limitation. For example, any one embodiment may be implemented in conjunction with features from any other embodiment listed herein, such as those described with reference to the other FIGS.

Further, the embodiments may be used in various applications, devices, systems, methods, etc. and/or in various permutations, which may or may not be specifically described in the illustrative embodiments listed herein. Thus, the breadth and scope of the embodiments should not be limited by any of the above-described exemplary embodiments, but should be defined only in accordance with the following claims and their equivalents.

What is claimed is:

1. A photon-sensitive infrared (IR) spectromicroscopy system, comprising:
    a light source;
    a plurality of cold mirrors configured to direct light emitted from the light source along a beam path;
    a sample holder positioned in the beam path and having portions transparent in at least a spectral range of interest, so light in the spectral range of interest is not absorbed and not emitted by the portions;
    a spectral device configured to direct a selected wavelength of light, polarization of light, and/or plurality thereof onto a detector;
    a plurality of cold apertures and a plurality of shields positioned along the beam path, the cold apertures and shields being configured to prevent thermal emission originating from the sample holder from reaching the detector;
    a sub-K refrigerator configured to maintain a detector temperature below an upper operational temperature threshold less than about 1.0 K; and
    an enclosure configured to thermally insulate the light source, the plurality of mirrors, the spectral device and the sub-K refrigerator; and
    wherein the sample holder is characterized by a path length less than a radiation equilibration length of a medium through which light from the light source travels.

2. The system as recited in claim 1, wherein the system is characterized by a lower detection limit of approximately a single photon.

3. The system as recited in claim 1, wherein the system is characterized by a lower detection limit of a single photon, wherein the single photon is characterized by a wavelength greater than about 1 micron and less than about 350 microns.

4. The system as recited in claim 1, wherein the enclosure is further configured to: maintain the detector temperature in a range from about 0.1 K to about 1.0 K; and
    optically insulate, the light source, the plurality of mirrors, the sample holder, and the spectral device.

5. The system as recited in claim 1, wherein the sample holder comprises two windows characterized by a gap therebetween.

6. The system as recited in claim 1, wherein the detector comprises a Cooper Pair Box-type detector.

7. The system as recited in claim 1, wherein the light source comprises a pulsed monochromatic quantum cascade laser (QCL).

8. The system as recited in claim 1, further comprising at least one filter in the enclosure, the filter being configured to block thermal microwave radiation characterized by a wavelength greater than a first wavelength threshold; and
    wherein the at least one filter comprises a metal foil mesh.

9. The system as recited in claim 1, wherein the detector is a transition edge sensor, and further comprising a superconducting solenoid installed next to the detector, to cause a superconducting transition temperature of the transition edge sensor to be at a desired temperature range; and
    wherein the superconducting solenoid has a core comprising iron.

10. The system as recited in claim 1, wherein the detector comprises a titanium transition-edge sensor (TES);
    wherein the detector is disposed as a film on a silicon substrate; and
    wherein the film of the TIS is characterized by a volume of approximately 0.1 $\mu m^3$.

11. The system as recited in claim 1, wherein the detector comprises a bridge, the bridge comprising:
    a first superconducting material; and
    a second superconducting material, the second superconducting material having a superconducting transition temperature (Tc) higher than a Tc of the first superconducting material;
    wherein the first superconducting material is in electrical contact with the second superconducting material; and
    wherein the bridge is characterized by a length less than a mid-IR radiation wavelength.

12. The system as recited in claim 11, wherein the first superconducting material is selected from a group consisting of titanium, titanium nitrite, and a molybdenum-gold alloy; and
    wherein the second superconducting material is selected from a group consisting of niobium, lead, tin, aluminum, and a niobium-titanium alloy.

13. The system as recited in claim 11, wherein the bridge is effectively coupled to radiation generated by a micro-antenna comprising one or more of gold and a niobium film.

14. The system as recited in claim 11, wherein the bridge is a microwave resonator.

15. The system as recited in claim 11, wherein the second superconducting material is arranged into one or more photon absorbing fins.

16. The system as recited in claim 1, wherein the sample holder is positioned outside the enclosure and configured to maintain nonequilibirum thermodynamic conditions at a temperature of approximately 300K for a sample in aqueous solution placed in the sample holder; and
    wherein a path length of the sample holder is less than a radiation equilibration length of water in a spectral region of interest.

17. A photon-sensitive infrared (IR) spectromicroscopy system, comprising:
    a light source;
    a plurality of cold mirrors configured to direct light emitted from the light source along a beam path;
    a sample holder positioned in the beam path and having portions transparent in at least the spectral range of interest, so light in the spectral range of interest is not absorbed and not emitted by the portions;
    a spectral device configured to direct a selected wavelength of light, polarization of light, and/or plurality thereof onto a detector;

a plurality of cold apertures and a plurality of shields positioned along the beam path, the cold apertures and shields being configured to prevent thermal emission originating from the sample holder from reaching the detector;

a sub-K refrigerator configured to maintain a detector temperature below an upper operational temperature threshold less than about 1.0 K; and an enclosure configured to thermally insulate the light source, the plurality of mirrors, the sample holder, the spectral device and the sub-K refrigerator;

wherein the sample holder comprises two windows characterized by a gap therebetween;

wherein the gap is characterized by a thickness t, and wherein t is approximately equal to a smallest dimension of a cell that would allow the cell to enter or pass through the gap without being damaged.

18. The system as recited in claim 5, wherein the windows are each transparent to light having a wavelength in a range between about 1.5 μm to about 0.1 mm.

19. A photon-sensitive infrared (IR) spectromicroscopy system, comprising:

a light source;

a plurality of cold mirrors configured to direct light emitted from the light source along a beam path;

a sample holder positioned in the beam path and having portions transparent in at least the spectral range of interest, so light in the spectral range of interest is not absorbed and not emitted by the portions;

a spectral device configured to direct a selected wavelength of light, polarization of light, and/or plurality thereof onto a detector;

a plurality of cold apertures and a plurality of shields positioned along the beam path, the cold apertures and shields being configured to prevent thermal emission originating from the sample holder from reaching the detector;

a sub-K refrigerator configured to maintain a detector temperature below an upper operational temperature threshold less than about 1.0 K; and an enclosure configured to thermally insulate the light source, the plurality of mirrors, the sample holder, the spectral device and the sub-K refrigerator;

wherein the detector is a transition edge sensor, and further comprising a superconducting solenoid installed next to the detector, to cause a superconducting transition temperature of the transition edge sensor to be at a desired temperature range; and wherein the superconducting solenoid is configured to generate a magnetic field having an axis of orientation substantially perpendicular to a longitudinal axis of the detector.

20. A method, comprising: performing photon-sensitive IR spectromicroscopy using the system as recited in claim 1 to detect a single molecule of interest present in a sample maintained at nonequilibrium thermodynamic conditions at a temperature of approximately 300K.

* * * * *